A. A. FRIESTEDT.
TIRE RIM MANIPULATOR.
APPLICATION FILED JAN. 3, 1916.
1,235,308.
Patented July 31, 1917.
2 SHEETS—SHEET 2.
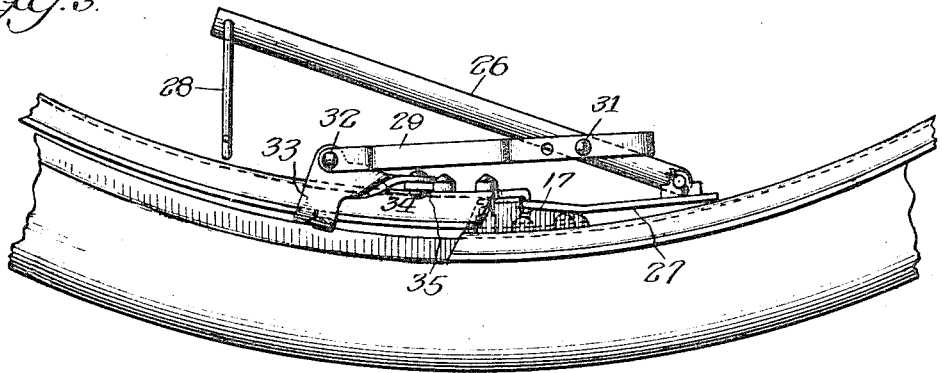
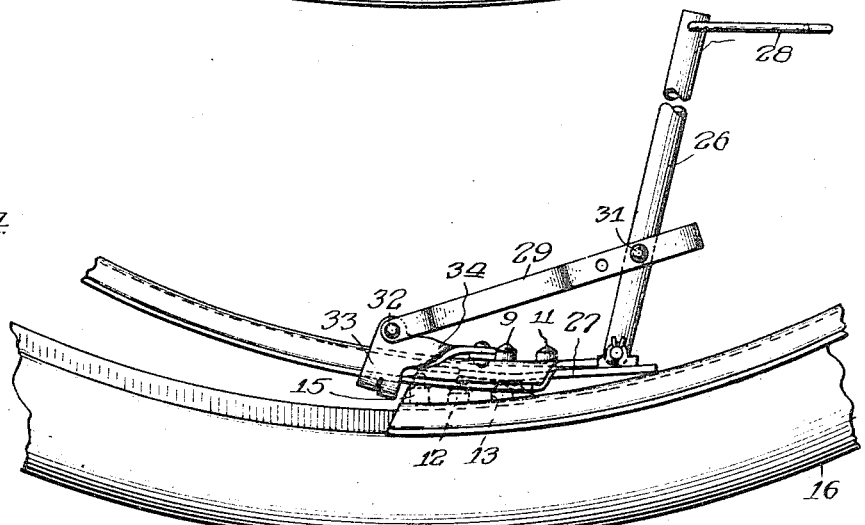
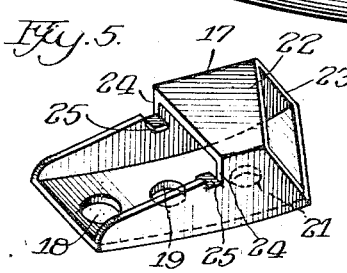
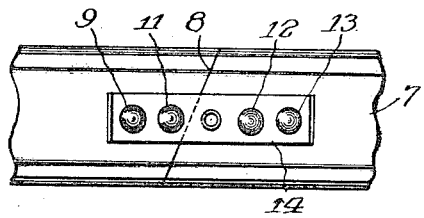

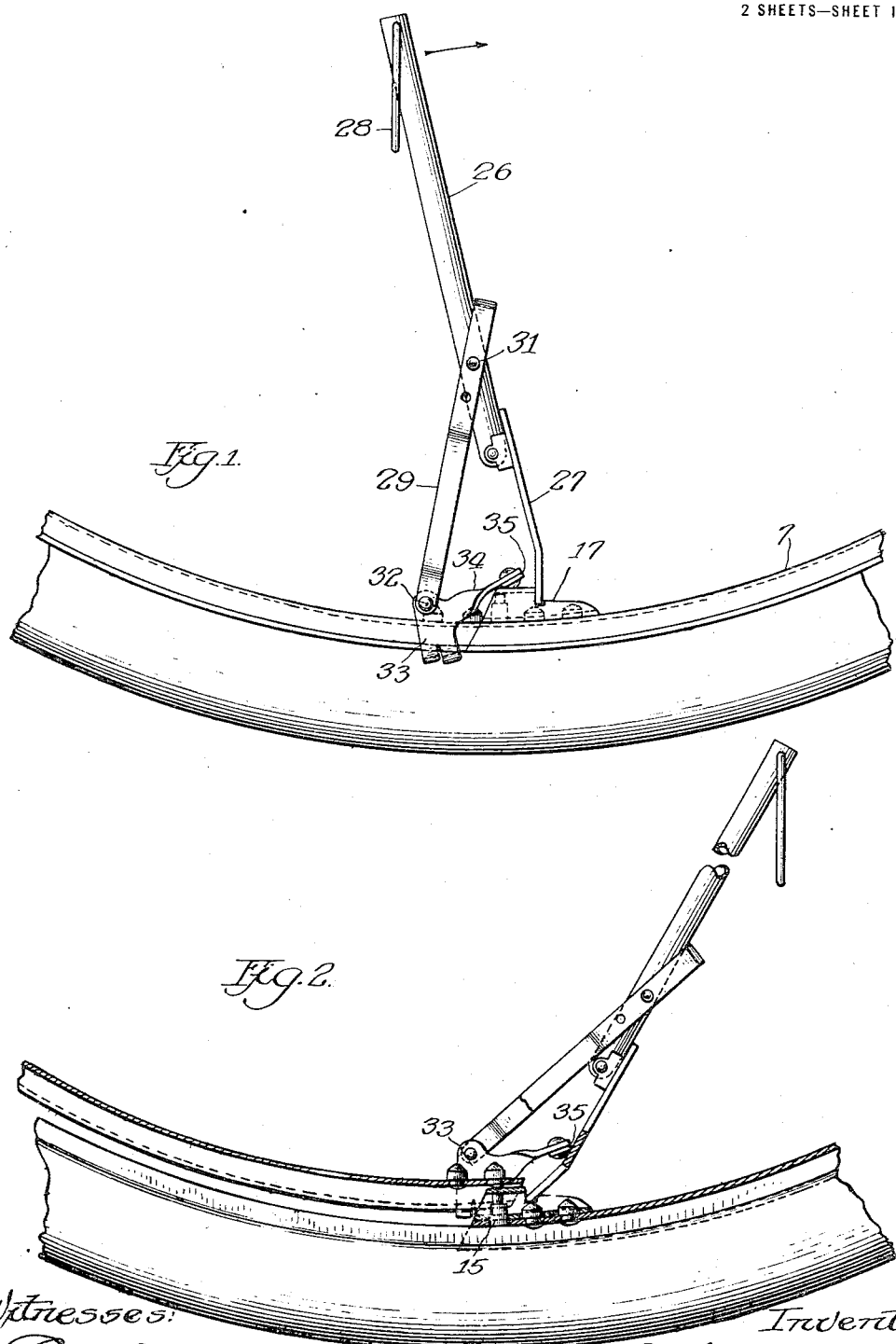

UNITED STATES PATENT OFFICE.

ARTHUR A. FRIESTEDT, OF CHICAGO, ILLINOIS, ASSIGNOR TO FRIESTEDT MANUFACTURING COMPANY, OF CHICAGO, ILLINOIS, A CORPORATION OF ILLINOIS.

TIRE-RIM MANIPULATOR.

1,235,308.   Specification of Letters Patent.   Patented July 31, 1917.

Application filed January 3, 1916. Serial No. 69,811.

*To all whom it may concern:*

Be it known that I, ARTHUR A. FRIESTEDT, a citizen of the United States, residing at Chicago, in the county of Cook and State of Illinois, have invented certain new and useful Improvements in Tire-Rim Manipulators, of which the following is a specification.

This invention relates in general to tire rim tools which are employed for breaking the joint of a demountable rim and reducing the diameter of the rim so that the tire can be readily removed and replaced.

There are at the present time several types of demountable rims on the market, among which is a rim known as the Baker rim. The joint of this rim extends diagonally thereacross for the purpose of permitting one end of the rim to be pulled laterally from the tire after the locking bar which engages a plurality of lugs on each end of the rim has been removed. The tire nipple is disposed adjacent to one end of the rim, and so far as I am aware the presence of the nipple in this location has prevented pulling one end of the rim inside the other to reduce the diameter of the tire since such an operation would result in injury to the nipple.

One of the primary objects of my present invention is the provision of the tool or, as I term it, a tire rim manipulator, by means of which this type of rim may be contracted to reduce its diameter so as to allow removal and replacement of the tire, the contraction of the rim being effected without injury to the tire nipple.

Another object of my invention is to provide a construction which will pull one end of the rim straight over the other so that the usual twisting and distortion which takes place in rims of this type upon removal from the tire is entirely eliminated.

Other objects and advantages of my invention will be readily appreciated as the same becomes better understood by reference to the following description when considered in connection with the accompanying drawings. Referring to the drawings,—

Figure 1 is a fragmentary side elevation of a tire rim and tire thereon, showing my manipulator in the first position in which it is applied to the rim;

Fig. 2 is a similar view showing the position of the parts after the rim joint has been broken;

Fig. 3 is a similar view showing the application of my tool to the rim for the purpose of further overlapping the ends;

Fig. 4 is a similar view showing the position of the parts when the ends are overlapped;

Fig. 5 is a perspective view of an adapter; and

Fig. 6 is a fragmentary plan view of a Baker rim showing the style of lock employed.

On the drawings reference character 7 indicates generally a tire-rim of the Baker type, the two ends of which abut against each other as shown in Fig. 6 on a line extending diagonally across the rim, this being the rim joint. The ends of the rim are provided in proximity to the joint with lugs 9, 11, 12 and 13 respectively, extending radially inwardly from the rim, and the joint is normally locked by a plate or bar 14 provided with apertures which fit over the lugs and hold the rim ends in alinement as shown in Fig. 6. It will be observed that the lugs 12 and 13 are located a little farther distant from the joint 8 than the lugs 9 and 11, and between the lug 12 and the joint the rim is provided with an aperture, as is also the bar 14, adapted to receive the usual nipple 15 of the pneumatic tire 16.

It will be manifest that after the rim has been removed from the wheel the ends can be readily released from each other by removing the locking bar 14 from the rim lugs. It has been the practice heretofore to then free the rim from the tire by pulling the left hand end, viewing Fig. 6, laterally of the tire, the joint 8 being disposed on an incline to permit this lateral movement of one end. It is, however, very difficult to release the rim from the tire in this manner and furthermore lateral bending and twisting of the rim distorts it so that it does not thereafter reassume its original position but remains slightly distorted, with the result that the rim and the tire carried thereby do not run true on the wheel.

My present invention is designed to free the rim from the tire by overlapping the rim ends without distorting the rim or twisting it laterally out of its original plane. With this end in view I have designed a member which I term an adapter, the same being shown in perspective in Fig. 5. This adapter, indicated generally by reference character 17, comprises a metal block or member shaped to engage the inner face of a tire rim and provided on its bottom with apertures 18 and 19 adapted to fit over the lugs 13 and 12 respectively, and an aperture 21 adapted to fit over the tire nipple. The top 22 of the member covers the nipple so that it is protected from injury when the rim ends are overlapped. The end of the member beyond the aperture 21 is shaped to present an inclined face 23 which conforms in transverse alinement with the incline of the rim joint 8 and is inclined rearwardly from bottom to top so as to present an inclined surface up which the opposed end of the tire rim may travel so as to pass the tire nipple without injuring the same. Rearwardly of the top 22 I have formed a plurality of shoulders 24, at the bottoms of which the metal is turned inwardly as indicated at 25 to form bearing surfaces for the toe of a shoe which will be later described.

The adapter, just described, is used preferably in connection with a tire tool or rim contractor of the general type disclosed in my prior Patent, No. 1,162,470, Nov. 30, 1915 and application Ser. No. 69,812 filed Jan. 3, 1916, and consists of a handle 26 having a shoe 27 pivoted to one end thereof and a locking hook 28 pivoted to the opposite end, a pair of link bars 29 being pivoted to the handle at 31 intermediate its ends, said link bars being pivotally attached at 32 to a pair of hook members 33 adapted to engage beneath the edges of a tire rim. These hook members each have a forwardly projecting arm 34 which arms are pivotally connected together by a toe or thrust bar 35 extending transversely between the arms 34.

In the operation of my improved manipulator, after the rim with the tire thereon has been removed from the wheel the locking bar 14 is first taken off. The adapter member 17 is then positioned over the lugs 12, 13 and the nipple 15, as shown in Fig. 1. The hook members 33 are engaged beneath the flanges of the opposed end of the rim, the shoe 27 is turned into substantial alinement with the handle and its lower end is positioned just back of the shoulders 24 upon the bearing portions 25 of the block 17, all as shown in Fig. 1, the thrust bar 35 being disposed on top of the member 17. The handle is then swung about the end of the shoe 27 as a pivot, in a clockwise direction, into the position shown in Fig. 2. This movement lifts the end of the rim engaged by the hooks 33, carries it upwardly along the inclined face 23 and disposes it upon the top 22 of the member 17, as shown in Fig. 2. It will be manifest that this operation breaks the rim joint and partially laps one end of the rim over the other. The tool is next positioned as shown in Fig. 3 by sliding the hooks 33 backwardly upon the rim until the thrust bar 35 engages behind the lug 9 and the shoe 27 is tilted so that it rests upon the rear end of the adapter member and upon the rim with its end abutting against the shoulders 24. The handle 26 is now swung in a clockwise direction, thereby pulling the end of the rim overlying the adapter member to the right over the shoe 27 into the position shown in Fig. 4, thereby contracting and reducing the diameter of the rim so that the tire can be readily removed and replaced. When the handle has been moved to completely contract the rim its outer end will be sufficiently close to the rim to permit the hook 28 to be engaged over the edge of the rim, thereby locking the rim in contracted position. The tire may now be removed and replaced, and upon releasing the hook 28 from the rim the overlapped end may be forced back into its original position.

It will be observed that by means of my improved manipulator I am enabled to contract the rim without distorting it laterally and at the same time without injuring or even touching the tire nipple lying quite close to the rim joint. The nipple is at all times adequately protected and the inclined face of the adapter member guides the rim upwardly and over the tire nipple so that the complete contraction of the rim may be readily effected without injury either to the tire or the rim.

I claim:

1. A tire rim manipulator, comprising a member constructed to engage with the lugs on the inner face of a tire rim and having an inclined face adapted to guide the opposed end of a tire rim upwardly over the tire nipple and also having a shoulder spaced from said face, and means adapted to engage the opposed end of the tire rim and said shoulder for forcing said end over said member.

2. A device of the character described, comprising a member adapted to engage the inner face of a tire rim and cover the tire nipple, said member having an inclined face at one end thereof, and a shoulder spaced from said face.

3. A device of the character described, comprising a member constructed to engage the inner face of a tire rim at one end thereof and to receive and project inwardly beyond the inwardly projecting end of a tire nipple so as to protect said nipple from injury by the other end of the rim when moved into overlapped position, said member having an inclined face adapted to facilitate movement of said other end into overlapped position.

4. A device of the character described, comprising a member constructed to engage the inner face of a tire rim at one end thereof, said member being shaped to engage with the rim locking device on said rim end whereby the member is held against displacement, said member being also shaped to receive and extend over the inner end of the tire nipple and having at its end an inclined guiding face adapted to facilitate movement of the opposed end of the tire rim into overlapped position.

ARTHUR A. FRIESTEDT.